United States Patent
Lu et al.

(10) Patent No.: US 12,213,233 B2
(45) Date of Patent: Jan. 28, 2025

(54) LIGHTING DEVICE HAVING RESETTABLE OVER-CURRENT PROTECTION FUNCTION

(71) Applicant: Xiamen PVTECH Co., Ltd., Fujian (CN)

(72) Inventors: Fuxing Lu, Fujian (CN); Chun Ming Liu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/527,391

(22) Filed: Dec. 4, 2023

(65) Prior Publication Data

US 2024/0414831 A1 Dec. 12, 2024

(30) Foreign Application Priority Data

Jun. 6, 2023 (CN) .......................... 202310659669.0

(51) Int. Cl.
| | |
|---|---|
| *H05B 47/25* | (2020.01) |
| *F21L 4/00* | (2006.01) |
| *H05B 45/3725* | (2020.01) |
| *H05B 47/17* | (2020.01) |

(52) U.S. Cl.
CPC ......... *H05B 47/25* (2020.01); *H05B 45/3725* (2020.01); *H05B 47/17* (2020.01); *F21L 4/00* (2013.01)

(58) Field of Classification Search
CPC .... H05B 47/25; H05B 45/3725; H05B 47/17; F21L 4/00
See application file for complete search history.

(56) References Cited

U.S. PATENT DOCUMENTS

| | | | | |
|---|---|---|---|---|
| 2016/0323947 | A1* | 11/2016 | Seki | ........................ H05B 45/10 |
| 2020/0272040 | A1* | 8/2020 | Yamamoto | ........... H04N 9/3155 |
| 2023/0223833 | A1* | 7/2023 | Newman, Jr. | ........ H02M 5/2573 363/126 |

FOREIGN PATENT DOCUMENTS

| | | |
|---|---|---|
| CN | 211859660 U | 11/2020 |
| CN | 114466499 A | 5/2022 |

* cited by examiner

*Primary Examiner* — Renan Luque
(74) *Attorney, Agent, or Firm* — Winston Hsu

(57) ABSTRACT

A lighting device having resettable over-current protection function includes a light source module, a power supplying module, a DC-to-DC converting module, an over-current short-circuit protection module, a reference voltage generating module and a self-locking protection module. The power supplying module generates an input voltage. The DC-to-DC converting module converts the input voltage into a driving voltage to drive the light source module. The over-current short-circuit protection module generates a voltage detecting by detecting a driving current passing through the light source module. The reference voltage generating module generates a reference voltage according to the input voltage and the voltage detecting signal. The self-locking protection module generates a control signal according to the input voltage and the reference voltage to turn off the over-current short-circuit protection module in order to perform a self-locking protection mode, such that the DC-to-DC converting module is disconnected from the light source module.

10 Claims, 3 Drawing Sheets

LIGHTING DEVICE HAVING RESETTABLE OVER-CURRENT PROTECTION FUNCTION

BACKGROUND OF THE INVENTION

1. Field of the Invention

The present invention relates to a lighting device, in particular to a lighting device having resettable over-current protection function.

2. Description of the Prior Art

Currently, portable lighting devices such as flashlights, handheld spotlights, handheld work lights, headlamps, etc., are widely used. These portable lighting devices are all powered by batteries and achieve different lighting functions through circuits. In order to enhance the safety of these lighting devices, most currently available portable lighting devices have short-circuit protection mechanisms, such as fuses, comparator lockout protection circuits with amplifiers, and resettable fuses.

However, once the fuse of a lighting device melts, the user needs to repair the lighting device, which is highly inconvenient. The comparator lockout protection circuit with an amplifier can repeatedly activate the short-circuit protection function but is only suitable for specific lighting devices. Moreover, this protection circuit cannot trigger the short-circuit protection function when the duty cycle of the pulse width modulation (PWM) signal is very small. Therefore, the application of the comparator lockout protection circuit is greatly limited, and its safety still needs to be further improved.

Resettable fuses can also repeatedly activate the short-circuit protection function. However, after the short-circuit protection function is triggered, there will still be some current in the circuit of the lighting device, which will reduce the service life of the battery of the lighting device.

China Patent No.: CN206993463U and China Patent No.: CN209517578U provide lighting devices with short-circuit protection functions, but these devices still cannot effectively solve the problems of prior art.

SUMMARY OF THE INVENTION

One embodiment of the present invention provides a lighting device having resettable over-current protection function, which includes a light source module, a power supplying module, a DC-to-DC converting module, an over-current short-circuit protection module, a reference voltage generating module and a self-locking protection module. The power supplying module generates an input voltage. The DC-to-DC converting module converts the input voltage into a driving voltage to drive the light source module. The over-current short-circuit protection module generates a voltage detecting by detecting a driving current passing through the light source module. The reference voltage generating module generates a reference voltage according to the input voltage and the voltage detecting signal. The self-locking protection module generates a control signal according to the input voltage and the reference voltage to turn off the over-current short-circuit protection module in order to perform a self-locking protection mode, such that the DC-to-DC converting module is disconnected from the light source module.

In one embodiment, the lighting device further includes an integral module. The integral module generates an integral signal according to the voltage detecting signal and outputs the integral signal to the self-locking protection module, such that the self-locking protection module maintains the self-locking protection mode.

In one embodiment, the power supplying module has a power source positive electrode and a power source negative electrode. The DC-to-DC converting module has an input terminal, a first output terminal and a second output terminal. The input terminal is connected to the power source positive electrode. The first output terminal is connected to a positive electrode of the light source module. The second output terminal is connected to a first node and a grounding point. The negative electrode of the light source module is connected to a second node.

In one embodiment, the combination of the over-current short-circuit protection module, the reference voltage generating module, the self-locking protection module and the integral module forms a resettable over-current protection circuit. The resettable over-current protection circuit includes a first transistor, a second transistor, a third transistor, a first resistor, a second resistor, a third resistor, a fourth resistor, a fifth resistor, a sixth resistor, a seventh resistor, a diode and a first capacitor.

In one embodiment, the first end of the first transistor is connected to a third node, the second end of the first transistor is connected to the second node, and the third end of the first transistor is connected to a fourth node. The first end of the second transistor is connected to a fifth node, the second end of the second transistor is connected to the third node, and the third end of the second transistor is connected to a sixth node. The first end of the third transistor is connected to the sixth node, the second end of the third transistor is connected to one end of the fifth resistor, and the third end of the third transistor is connected to the fifth node. The other end of the fifth resistor is connected to a seventh node and the seventh node is connected to the power source positive electrode. The two ends of the second resistor are connected to the seventh node and an eighth node respectively, and the two ends of the first resistor are connected to the fifth node and the eighth node respectively. The two ends of the third resistor are connected to the first node and the fourth node, respectively, and the two ends of the fourth resistor are connected to the second node and the third node respectively. The two ends of the sixth resistor are connected to the fourth node and the fifth node respectively, and the two ends of the seventh resistor are connected to the first node and the sixth node respectively. The two ends of the first capacitor are connected to the first node and the fifth node respectively, and the two ends of the diode are connected to the first node and the eighth node respectively.

In one embodiment, the first transistor, the second transistor and the third transistor are metal-oxide-semiconductor field-effect transistors (MOSFETs) or bipolar junction transistors (BJTs).

In one embodiment, the diode is a Zener diode or a three-terminal voltage regulator.

In one embodiment, when the power supplying module is disconnected from the DC-to-DC converting module, the self-locking protection mode is automatically turned off.

In one embodiment, the power supplying module is a battery or a DC power source.

In one embodiment, the light source module is a light-emitting diode (LED).

The lighting device having resettable over-current protection function in accordance with the embodiments of the present invention may have the following advantages:

(1) In one embodiment of the present invention, the lighting device includes a resettable over-current protection circuit, which can function as a self-locking over-current protection circuit to execute a self-locking protection mode for providing the over-current protection function. When the fault is resolved, simply reconnecting the power supplying module can automatically turn off the self-locking protection mode to prevent fault expansion and avoid that the lighting device is damaged.

(2) In one embodiment of the present invention, the resettable over-current protection circuit can be applied to most portable lighting devices and can effectively execute the self-locking protection mode to provide the over-current protection function without being limited by the duty cycle of pulse width modulation (PWM) signals. Additionally, the resettable over-current protection circuit can prevent the lighting device from repeatedly restarting. Therefore, the application of the resettable over-current protection circuit can be more comprehensive and significantly enhances the safety of the lighting device.

(3) In one embodiment of the present invention, the resettable over-current protection circuit of the lighting device can execute the self-locking protection mode to provide the over-current protection function. Furthermore, once in the self-locking protection mode, the resettable over-current protection circuit does not produce large currents. As a result, the service life of the power supplying module is not reduced due to overload, which can increase the service life of the lighting device and conform to the requirements of environmental protection.

(4) In one embodiment of the present invention, all of the circuit components of the resettable over-current protection circuit of the lighting device can be hardware circuit components and can effectively execute the self-locking protection mode. Therefore, the resettable over-current protection circuit can achieve high reliability so as to conform to actual requirements.

(5) In one embodiment of the present invention, the resettable over-current protection circuit of the lighting device includes an integral module, which can enhance the anti-interference ability of the resettable over-current protection circuit. In this way, the resettable over-current protection circuit can normally operate without being influenced by interferences duo to different factors. Consequently, the performance of the resettable over-current protection circuit can be significantly improved, so the lighting device can achieve high safety.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
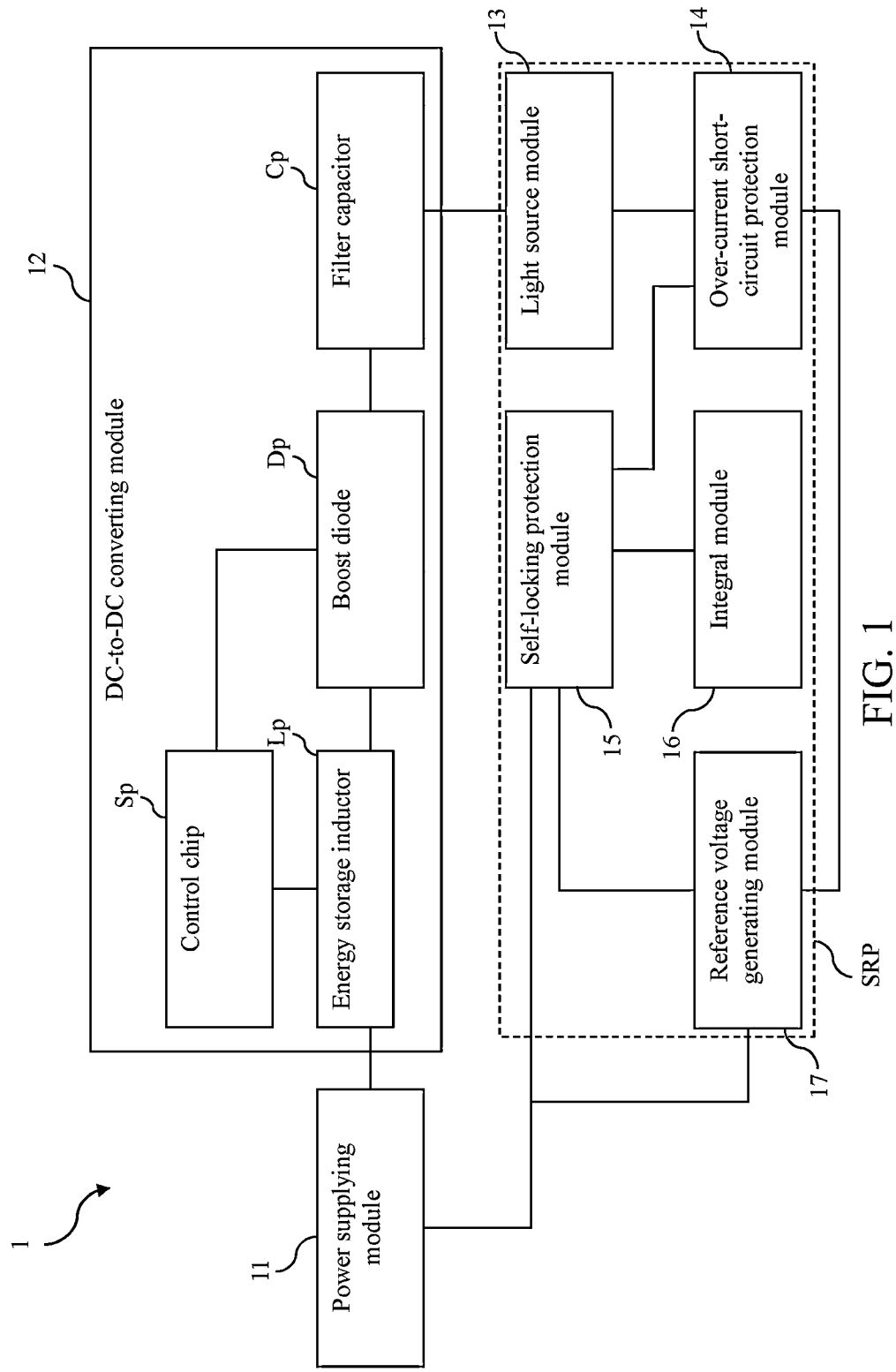
FIG. 1 is the block diagram of the circuit structure of a lighting device having resettable over-current protection function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is the block diagram of the circuit structure of a lighting device having resettable over-current protection function in accordance with one embodiment of the present invention. As shown in FIG. 1, the lighting device 1 includes a light source module 13, a power supplying module 11, a DC (direct-current)-to-DC converting module 12, an over-current short-circuit protection module 14, a self-locking protection module 15, an integral module 16, and a reference voltage generating module 17. The combination of the over-current short-circuit protection module 14, the reference voltage generating module 17, the self-locking protection module 15 and the integral module 16 can form a resettable over-current protection circuit SRP. The lighting device 1 can be a portable lighting device, such as a flashlight, handheld searchlight, handheld work light, headlamp, etc.

The DC-to-DC converting module 12 is connected to the power supplying module 11. In this embodiment, the DC-to-DC converting module 12 is a buck-boost converter. The DC-to-DC converting module 12 includes a control chip Sp, an energy storage inductor Lp, a boost diode Dp and a filter capacitor Cp. The circuit structure and operating mechanism of the DC-to-DC converting module 12 should be known by those skilled in the art, so will not be described herein. In another embodiment, the DC-to-DC converting module 12 can be a buck converter, boost converter, or other similar components. In one embodiment, the power supplying module 11 can be a Li-ion battery, a Ni—Cd battery, a Ni—MH battery, a zinc-carbon battery or other DC power sources.

The light source module 13 is connected to the DC-to-DC converting module 12. In one embodiment, the light source module 13 can be a light-emitting diode (LED), several LEDs connected in series, an LED array, a bulb, or similar components.

The over-current short-circuit protection module 14 is connected to the light source module 13. The self-locking protection module 15 is connected to the over-current short-circuit protection module 14 and the power supplying module 11. The integral module 16 is connected to the self-locking protection module 15. The reference voltage generating module 17 is connected to the power supplying module 11, the self-locking protection module 15, and the over-current short-circuit protection module 14.

The embodiment just exemplifies the present invention and is not intended to limit the scope of the present invention; any equivalent modification and variation according to the spirit of the present invention is to be also included within the scope of the following claims and their equivalents.

Figure 2:
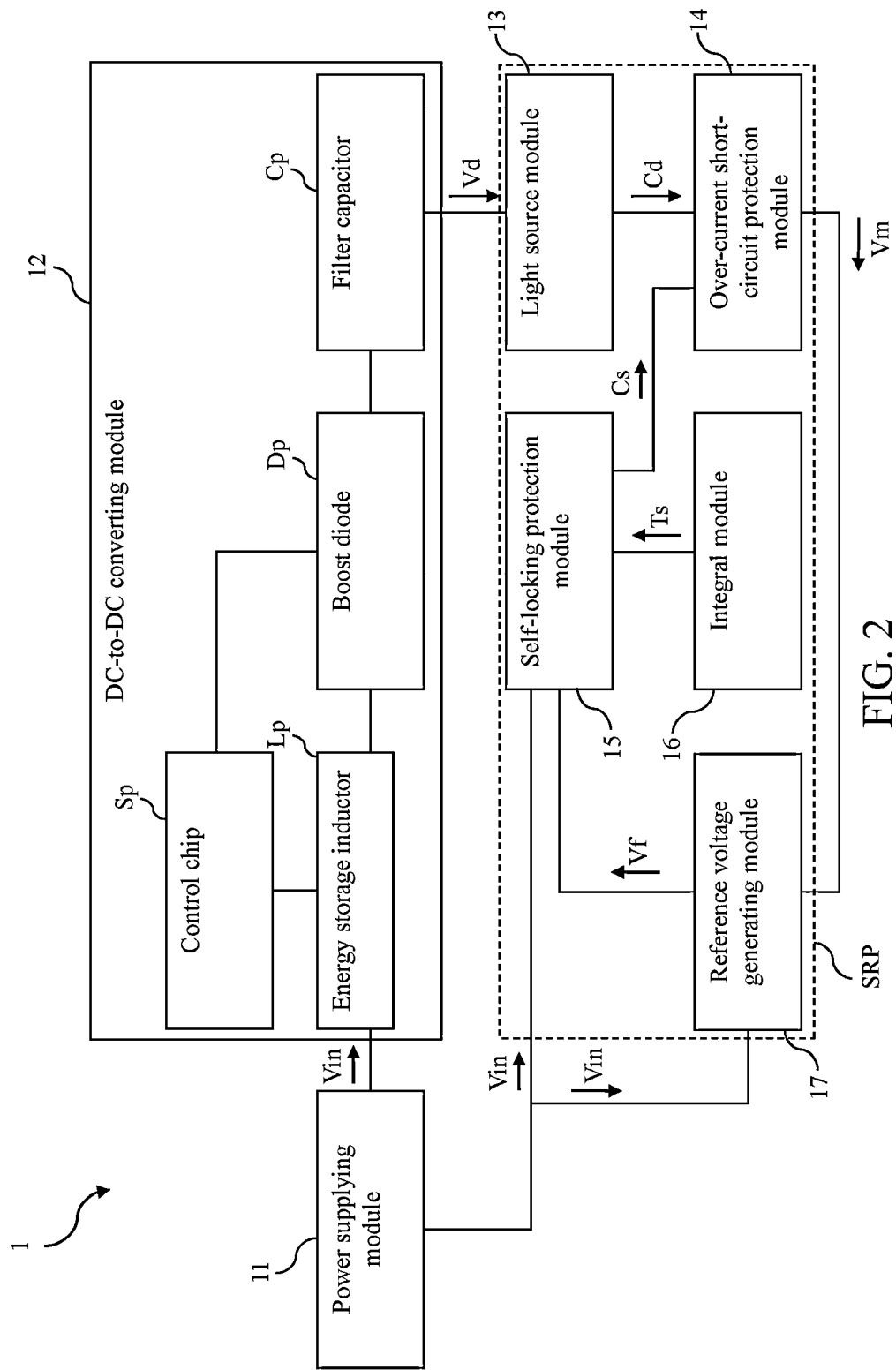
FIG. 2 is the schematic view of the operating state of the lighting device having resettable over-current protection function in accordance with one embodiment of the present invention.

Please refer to FIG. 2, which is the schematic view of the operating state of the lighting device having resettable over-current protection function in accordance with one embodiment of the present invention. As shown in FIG. 2, the power supplying module 11 generates an input voltage Vin.

Then, the DC-to-DC converting module 12 converts the input voltage Vin into generate a driving voltage Vd and outputs the driving voltage Vd to the light source module 13 so as to drive the light source module 13.

Next, the over-current short-circuit protection module 14 detects the driving current Cd through the light source module 13 to generate a voltage detection signal Vm.

Afterward, the reference voltage generating module 17 generates a reference voltage Vf according to the input voltage Vin and the voltage detecting signal Vm.

Finally, the self-locking protection module 15 generates a control signal Cs based on the input voltage Vin and the reference voltage Vf to turn off the over-current short-circuit protection module 14 with a view to executing the self-locking protection mode. When the self-locking protection module 15 executes the self-locking protection mode, the self-locking protection module 15 can disconnect the connection between the DC-to-DC converting module 12 and the light source module 13 in order to make the lighting device 1 enter the over-current short-circuit protection state.

In addition, the integral module 16 can generate an integral signal Ts according to the voltage detecting signal Vm and output the integral signal Ts to the self-locking protection module 15. Therefore, the self-locking protection module 15 can continuously maintain the self-locking protection mode, such that the lighting device 1 can remain in the over-current short-circuit protection state.

The embodiment just exemplifies the present invention and is not intended to limit the scope of the present invention; any equivalent modification and variation according to the spirit of the present invention is to be also included within the scope of the following claims and their equivalents.

The lighting device 1 has the resettable over-current protection circuit SRP, which can function as the self-locking over-current protection circuit to execute the self-locking protection mode so as to provide the over-current protection function. When the fault is resolved, simply reconnecting the power supplying module 11 can automatically turn off the self-locking protection mode to prevent fault expansion and avoid that the lighting device 1 is damaged.

The aforementioned resettable over-current protection circuit SRP can be applied to most portable lighting devices and can effectively execute the self-locking protection mode to provide the over-current protection function without being limited by the duty cycle of PWM signals. Additionally, the resettable over-current protection circuit SRP can prevent the lighting device 1 from repeatedly restarting. Therefore, the application of the resettable over-current protection circuit SRP can be more comprehensive and significantly enhances the safety of the lighting device 1.

The resettable over-current protection circuit SRP includes the integral module 16, which can enhance the anti-interference ability of the resettable over-current protection circuit SRP. In this way, the resettable over-current protection circuit SRP can normally operate without being influenced by interferences duo to different factors. Consequently, the performance of the resettable over-current protection circuit SRP can be significantly improved, so the lighting device 1 can achieve high safety.

The embodiment just exemplifies the present invention and is not intended to limit the scope of the present invention; any equivalent modification and variation according to the spirit of the present invention is to be also included within the scope of the following claims and their equivalents.

It is worthy to point out that most currently available portable lighting devices have short-circuit protection mechanisms, such as fuses, comparator lockout protection s with amplifiers, and resettable fuses. However, these short-circuit protection mechanisms still have many shortcomings, so these short-circuit protection mechanisms need to be further improved. On the contrary, according to one embodiment of the present invention, the lighting device includes a resettable over-current protection circuit, which can function as a self-locking over-current protection circuit to execute a self-locking protection mode for providing the over-current protection function. When the fault is resolved, simply reconnecting the power supplying module can automatically turn off the self-locking protection mode to prevent fault expansion and avoid that the lighting device is damaged.

Also, according to one embodiment of the present invention, the resettable over-current protection circuit can be applied to most portable lighting devices and can effectively execute the self-locking protection mode to provide the over-current protection function without being limited by the duty cycle of pulse width modulation (PWM) signals. Additionally, the resettable over-current protection circuit can prevent the lighting device from repeatedly restarting. Therefore, the application of the resettable over-current protection circuit can be more comprehensive and significantly enhances the safety of the lighting device.

Further, according to one embodiment of the present invention, the resettable over-current protection circuit of the lighting device can execute the self-locking protection mode to provide the over-current protection function. Furthermore, once in the self-locking protection mode, the resettable over-current protection circuit does not produce large currents. As a result, the service life of the power supplying module is not reduced due to overload, which can extend the service life of the lighting device and meet the requirements of environmental protection.

Moreover, according to one embodiment of the present invention, all of the circuit components of the resettable over-current protection circuit of the lighting device can be hardware circuit components and can effectively execute the self-locking protection mode. Therefore, the resettable over-current protection circuit can achieve high reliability so as to conform to actual requirements.

Furthermore, according to one embodiment of the present invention, the resettable over-current protection circuit of the lighting device includes an integral module, which can enhance the anti-interference ability of the resettable over-current protection circuit. In this way, the resettable over-current protection circuit can normally operate without being influenced by interferences duo to different factors. Consequently, the performance of the resettable over-current protection circuit can be significantly improved, so the lighting device can achieve high safety. As set forth above, the lighting device having resettable over-current protection function according to the embodiments can definitely achieve great technical effects.

Figure 3:
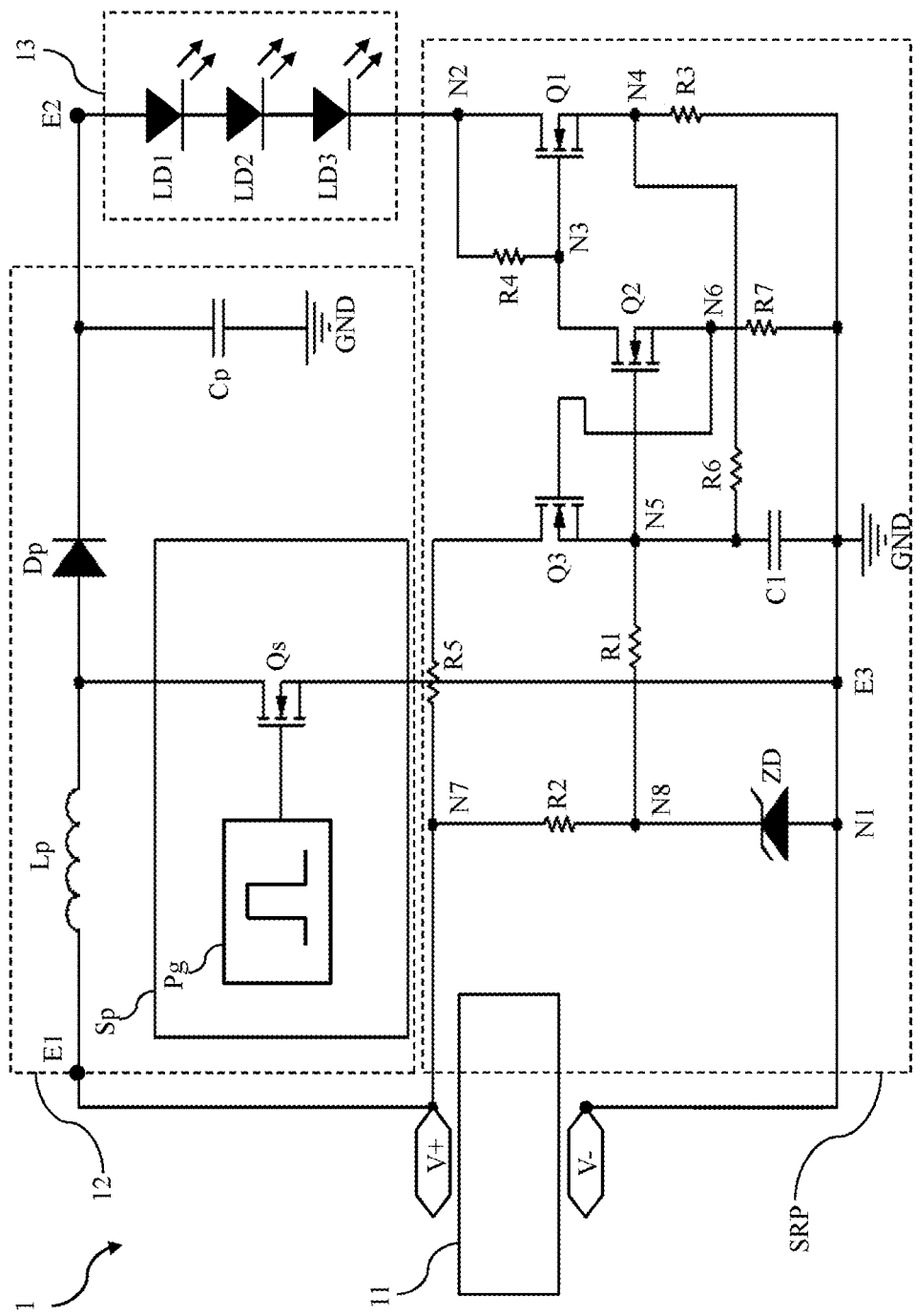
FIG. 3 is the circuit diagram of the circuit structure of the lighting device having resettable over-current protection function in accordance with one embodiment of the present invention.

Please refer to FIG. 3, which is the circuit diagram of the circuit structure of the lighting device having resettable over-current protection function in accordance with one embodiment of the present invention. Please also refer to FIG. 1 and FIG. 2. This embodiment illustrates the detailed circuit structure of the lighting device 1. As shown in FIG. 3, the lighting device 1 includes the power supplying module 11, the DC-to-DC converting module 12, the light source module 13 and the resettable over-current protection circuit SRP. As described above, the resettable over-current protection circuit SRP includes the over-current short-circuit protection module 14, the reference voltage generating module 17, the self-locking protection module 15 and the integral module 16 (as shown in FIG. 1 and FIG. 2). In this embodiment, the light source module 13 includes a plurality of LEDS LD1~LD3.

The power supplying module 11 has a power source positive electrode V+ and a power source negative electrode V−. As mentioned earlier, the power supplying module 11 can be a battery or a DC power source.

The DC-to-DC converting module 12 includes a control chip Sp, an energy storage inductor Lp, a boost diode Dp and a filter capacitor Cp. The control chip Sp includes a signal generator Pg and a control transistor Qs. The circuit structure and operating mechanism of the DC-to-DC converting module 12 should be known by those skilled in the art and will not be not described herein. The DC-to-DC converting module 12 has an input terminal E1, a first output terminal E2, and a second output terminal E3. The input terminal E1 of the DC-to-DC converting module 12 is connected to the power source positive electrode V+ of the power supplying module 11. The first output terminal E2 of the DC-to-DC converting module 12 is connected to the positive electrode of the light source module 13. The second output terminal E3 of the DC-to-DC converting module 12 is connected to the first node N1 and the grounding point GND. The negative electrode of the light source module 13 is connected to the second node N2.

The resettable over-current protection circuit SRP includes a first transistor Q1, a second transistor Q2, a third transistor Q3, a first resistor R1, a second resistor R2, a third resistor R3, a fourth resistor R4, a fifth resistor R5, a sixth resistor R6, a seventh resistor R7, a diode ZD, and a first capacitor C1. In this embodiment, the first transistor Q1, the second transistor Q2, and the third transistor Q3 are metal-oxide-semiconductor field-effect transistors (MOSFETs). In another embodiment, the first transistor Q1, the second transistor Q2, and the third transistor Q3 can also be bipolar junction transistors (BJTs) or other similar components. In this embodiment, the diode ZD can be a Zener diode. In another embodiment, the diode ZD can also be a three-terminal voltage regulator or other similar components.

The first end (gate) of the first transistor Q1 is connected to the third node N3, the second end (drain) of the first transistor Q1 is connected to the second node N2, and the third end (source) of the first transistor Q1 is connected to the fourth node N4. The first end (gate) of the second transistor Q2 is connected to the fifth node N5, the second end (drain) of the second transistor Q2 is connected to the third node N3, and the third end (source) of the second transistor Q2 is connected to the sixth node N6. The first end (gate) of the third transistor Q3 is connected to the sixth node N6, the second end (drain) of the third transistor Q3 is connected to one end of the fifth resistor R5, and the third end (source) of the third transistor Q3 is connected to the fifth node N5 (in this embodiment, the first transistor Q1, the second transistor Q2, and the third transistor Q3 are all n-channel MOSFETs). The other end of the fifth resistor R5 is connected to the seventh node N7, and the seventh node N7 is connected to the power source positive electrode V+ of the power supplying module 11. The two ends of the second resistor R2 are connected to the seventh node N7 and the eighth node N8. The two ends of the first resistor R1 are connected to the fifth node N5 and the eighth node N8 respectively. The two ends of the third resistor R3 are connected to the first node N1 and the fourth node N4 respectively. The two ends of the fourth resistor R4 are connected to the second node N2 and the third node N3 respectively. The two ends of the sixth resistor R6 are connected to the fourth node N4 and the fifth node N5 respectively. The two ends of the seventh resistor R7 are connected to the first node N1 and the sixth node N6 respectively. The two ends of the first capacitor C1 are connected to the first node N1 and the fifth node N5 respectively. The two ends of the diode ZD are connected to the first node N1 and the eighth node N8 respectively.

When the light source module 13 is not connected to the DC-to-DC converting module 12 and the resettable over-current protection circuit SRP, the gate voltage of the second transistor Q2 can be expressed by Equation (1) given below:

$$Vg2=(r3+r6)/(r1+r3+r6)*Vzd \qquad (1)$$

In Equation (1), Vg2 stands for the gate voltage of the second transistor Q2; r1 stands for the resistance of the first resistor R1; r3 stands for the resistance of the third resistor R3; r6 stands for the resistance of the sixth resistor R6; Vzd stands for the voltage across the diode.

When the light source module 13 is connected to the DC-to-DC converting module 12 and the resettable over-current protection circuit SRP, the driving current Cd passes through the first transistor Q1 and the third resistor R3 to reach the power source negative electrode V− of the power supplying module 11. At this time, a potential difference is generated across the two ends of the third resistor R3, causing an increase in the gate voltage of the second transistor Q2.

When the driving current Cd continues to increase, the potential difference across the two ends of the third resistor R3 also continues to increase, which makes the gate voltage of the second transistor Q2 continuously increase. When the gate voltage of the second transistor Q2 continues to increase to the gate threshold voltage, the second transistor Q2 is turned on (the maximal load current can be calculated from the above mechanism). At the same time, the gate voltage of the first transistor Q1 decreases, which makes the first transistor Q1 be turned off.

Then, as the second transistor Q2 is turned on, the potential difference across the two ends of the seventh resistor R7 quickly rises, causing an increase in the gate voltage of the third transistor Q3. When the gate voltage of the third transistor Q3 increases to the gate threshold voltage, the third transistor Q3 is turned on. At this time, the power supplying module 11 can provide voltage to the gate of the second transistor Q2 through the fifth resistor R5 and the third transistor Q3, which makes the second transistor Q2 continuously remain the on state.

On the other hand, the integral module 16, including the third resistor R3, the sixth resistor R6, and the first capacitor C1, can enhance the anti-interference ability of the resettable over-current protection circuit SRP to prevent the second transistor Q2 from incorrectly operating. Therefore, the operation of the resettable over-current protection circuit SRP is less susceptible to interference. Additionally, when the driving current Cd decreases to its normal value or zero, the first capacitor C1 of the integral module 16 can provide voltage to the gate of the second transistor Q2 to make the second transistor Q2 remain the on state until the third transistor Q3 is turned on, such that the power supplying module 11 can apply voltage to the gate of the second transistor Q2. As previously stated, it can be seen that the resettable over-current protection circuit SRP can provide dual protection mechanisms to ensure that the second transistor Q2 is always in the on state in the self-locking protection mode, which can effectively perform the self-locking protection mode.

In this way, the self-locking protection mode can be automatically turned off when the user separates the power supplying module 11 from the lighting device 11. Thus, the user does not need to repair the lighting device 1, which is more convenient in use. Accordingly, the lighting device 1 can conform to actual requirements. When the fault is resolved, simply reconnecting the power supplying module 11 can automatically turn off the self-locking protection mode to prevent fault expansion and avoid that the lighting device 1 is damaged.

Further, the resettable over-current protection circuit SRP of the lighting device 1 can execute the self-locking protection mode to provide the over-current protection function. Furthermore, once in the self-locking protection mode, the resettable over-current protection circuit SRP does not produce large currents. As a result, the service life of the power supplying module 11 is not reduced due to overload, which can extend the service life of the lighting device 1 and meet the requirements of environmental protection.

Moreover, as described above, all of the circuit components of the resettable over-current protection circuit SRP of the lighting device 1 can be hardware circuit components and can effectively execute the self-locking protection mode. Therefore, the resettable over-current protection circuit SRP can achieve high reliability so as to conform to actual requirements.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device includes a resettable over-current protection circuit, which can function as a self-locking over-current protection circuit to execute a self-locking protection mode for providing the over-current protection function. When the fault is resolved, simply reconnecting the power supplying module can automatically turn off the self-locking protection mode to prevent fault expansion and avoid that the lighting device is damaged.

Also, according to one embodiment of the present invention, the resettable over-current protection circuit can be applied to most portable lighting devices and can effectively execute the self-locking protection mode to provide the over-current protection function without being limited by the duty cycle of pulse width modulation (PWM) signals. Additionally, the resettable over-current protection circuit can prevent the lighting device from repeatedly restarting. Therefore, the application of the resettable over-current protection circuit can be more comprehensive and significantly enhances the safety of the lighting device.

Further, according to one embodiment of the present invention, the resettable over-current protection circuit of the lighting device can execute the self-locking protection mode to provide the over-current protection function. Furthermore, once in the self-locking protection mode, the resettable over-current protection circuit does not produce large currents. As a result, the service life of the power supplying module is not reduced due to overload, which can extend the service life of the lighting device and meet the requirements of environmental protection.

Moreover, according to one embodiment of the present invention, all of the circuit components of the resettable over-current protection circuit of the lighting device can be hardware circuit components and can effectively execute the self-locking protection mode. Therefore, the resettable over-current protection circuit can achieve high reliability so as to conform to actual requirements.

Furthermore, according to one embodiment of the present invention, the resettable over-current protection circuit of the lighting device includes an integral module, which can enhance the anti-interference ability of the resettable over-current protection circuit. In this way, the resettable over-current protection circuit can normally operate without being influenced by interferences duo to different factors. Consequently, the performance of the resettable over-current protection circuit can be significantly improved, so the lighting device can achieve high safety.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device having resettable over-current protection function, comprising:
    a light source module;
    a power supplying module configured to generate an input voltage;
    a DC (direct-current)-to-DC converting module configured to convert the input voltage into a driving voltage to drive the light source module;
    an over-current short-circuit protection module configured to generate a voltage detecting by detecting a driving current passing through the light source module;
    a reference voltage generating module configured to generate a reference voltage according to the input voltage and the voltage detecting signal; and
    a self-locking protection module configured to generate a control signal according to the input voltage and the reference voltage to turn off the over-current short-circuit protection module in order to perform a self-locking protection mode, whereby the DC-to-DC converting module is disconnected from the light source module.

2. The lighting device having resettable over-current protection function as claimed in claim 1, further comprising an integral module configured to generate an integral signal according to the voltage detecting signal and output the integral signal to the self-locking protection module, whereby the self-locking protection module maintains the self-locking protection mode.

3. The lighting device having resettable over-current protection function as claimed in claim 2, wherein the power supplying module has a power source positive electrode and a power source negative electrode, and the DC-to-DC converting module has an input terminal, a first output terminal and a second output terminal, wherein the input terminal is connected to the power source positive electrode, the first output terminal is connected to a positive electrode of the light source module, the second output terminal is connected to a first node and a grounding point, and a negative electrode of the light source module is connected to a second node.

4. The lighting device having resettable over-current protection function as claimed in claim 3, wherein a combination of the over-current short-circuit protection module, the reference voltage generating module, the self-locking protection module and the integral module forms a resettable over-current protection circuit, and the resettable over-current protection circuit comprises a first transistor, a second transistor, a third transistor, a first resistor, a second resistor, a third resistor, a fourth resistor, a fifth resistor, a sixth resistor, a seventh resistor, a diode and a first capacitor.

5. The lighting device having resettable over-current protection function as claimed in claim 4, wherein a first end of the first transistor is connected to a third node, a second end of the first transistor is connected to the second node, and a third end of the first transistor is connected to a fourth node, wherein a first end of the second transistor is connected to a fifth node, a second end of the second transistor is connected to the third node, and a third end of the second transistor is connected to a sixth node, wherein a first end of the third transistor is connected to the sixth node, a second end of the third transistor is connected to one end of the fifth resistor, and a third end of the third transistor is connected to the fifth node, wherein another end of the fifth resistor is connected to a seventh node, the seventh node is connected to the power source positive electrode, wherein two ends of the second resistor are connected to the seventh node and an eighth node respectively, and two ends of the first resistor are connected to the fifth node and the eighth node respectively, wherein two ends of the third resistor are connected to the first node and the fourth node, respectively, and two ends of the fourth resistor are connected to the second node and the third node respectively, wherein two ends of the sixth resistor are connected to the fourth node and the fifth node respectively, and two ends of the seventh resistor are connected to the first node and the sixth node respectively, wherein two ends of the first capacitor are connected to the first node and the fifth node respectively, and two ends of the diode are connected to the first node and the eighth node respectively.

6. The lighting device having resettable over-current protection function as claimed in claim 5, wherein the first transistor, the second transistor and the third transistor are metal-oxide-semiconductor field-effect transistors or bipolar junction transistors.

7. The lighting device having resettable over-current protection function as claimed in claim 5, wherein the diode is a Zener diode or a three-terminal voltage regulator.

8. The lighting device having resettable over-current protection function as claimed in claim 1, wherein when the power supplying module is disconnected from the DC-to-DC converting module, the self-locking protection mode is automatically turned off.

9. The lighting device having resettable over-current protection function as claimed in claim 1, wherein the power supplying module is a battery or a DC power source.

10. The lighting device having resettable over-current protection function as claimed in claim 1, wherein the light source module is a light-emitting diode.

* * * * *